3,509,160
9(PYRROLIDINYL- AND PIPERIDINYL-ALKOXY)-
ETHANOANTHRACENES
Max Wilhelm, Allschwil, Switzerland, assignor to Ciba Corporation, New York, N.Y., a corporation of Delaware
No Drawing. Filed June 23, 1967, Ser. No. 648,201
Claims priority, application Switzerland, July 18, 1966, 10,380/66; May 17, 1967, 6,927/67
Int. Cl. C07d 29/18, 27/28
U.S. Cl. 260—294.7
4 Claims

ABSTRACT OF THE DISCLOSURE 9-amino-alkoxy-9,10-dihydro-9,10-ethano - anthracenes of the formula

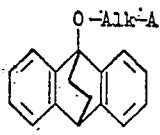

wherein Alk is an alkylene radical separating A from O by a least two carbon atoms and A is an amino group, and which may be optionally substituted at any of the ring carbon atoms, and salts thereof, show anti-allergic, antihistaminic, and antimescaline effects.

Summary of the invention

The present invention relates to 9-amino-alkoxy-9,10-dihydro-9,10-ethano-anthracenes containing the nucleus of the formula

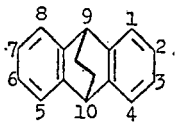

with the oxygen atom of the aminoalkoxy group being separated from the nitrogen atom by at least two carbon atoms, and of their salts, and to the manufacture of these compounds as well as to pharmaceutical compositions containing them.

The new compounds possess valuable pharmacological properties. Thus, in addition to an anti-allergic effect they display primarily an anti-histaminic effect as can be demonstrated in animal tests, for example on the guinea-pig intestines and treating a histamine shock. Furthermore they display for instance in animal tests, for example on mice, an anti-mescaline effect. The new compounds may therefore be used as anti-histaminics and anti-allergics and psychotropic pharmaceuticals. The new compounds are also valuable intermediates for the manufacture of other useful substances, especially those having a pharmacological activity.

Description of the preferred embodiments

In the new compounds the amino group of the aminoalkyl radical may be unsubstiuted, but it is preferably mono- or disubstituted, above all by lower aliphatic, cycloaliphatic, araliphatic or aromatic hydrocarbon radicals; the aliphatic and cycloaliphatic radicals may be interrupted by hetero atoms such as oxygen, sulfur or nitrogen. Aliphatic radicals may be substituted by free hydroxyl, amino or mercapto groups or by halogen atoms such as fluorine, chlorine, bromine, or iodine, and aromatic groups by lower alkyl, alkoxy or alkenyloxy groups, for example by those mentioned further on or by halogen atoms such as fluorine, chlorine, bromine or iodine or by the pseudohalogen trifluoromethyl. Suitable lower hydrocarbon radicals are above all lower alkyl or alkenyl groups such as methyl, ethyl, propyl isopropyl, linear or branched butyl, pentyl, hexyl or heptyl radicals which may be linked in any desired position; allyl or methallyl groups; unsubstituted or alkyl-substituted cycloalkyl or cycloalkenyl radicals such as cyclopentyl, cyclohexyl, cycloheptyl, cyclopentenyl, cyclohexenl groups; unsubstituted or alkyl-substituted cycloalkyl- or -alkenylalkyl radicals, such as cyclopentyl- or cyclohexenyl-methyl, ethyl or -propyl radicals; aralkyl or aralkenyl such as phenylmethyl, -ethyl, -vinyl or -propyl radicals; or aryl, especially phenyl, radicals; or alkylene or alkenylene radicals such, for example as, butylene-(1,4), pentylene-(1,5), 1,5-dimethyl-pentylene-(1,5), hexylene-(1,6) or hexylene-(1,5). Radicals of this kind that are interrupted by hetero atoms are, for example, alkoxyalkyl or oxa-cycloalkylalkyl radicals such as methoxyethyl, ethoxyethyl, propoxyethyl, butoxyethyl, methoxypropyl, methoxyethoxyethyl, tetrahydrofurylmethyl, methylmercaptoethyl, oxa-, aza- or thia-alkylene or -alkenylene radicals such as 3-aza-, 3-oxa- or 3-thia-pentylene-(1,5), 3-aza-hexylene-(1,6), 1,5- dimethyl-3-aza-pentylene-(1,5), 3-methyl-3-aza-pentylene-(1,5) or 3-hydroxyethyl-3-aza-pentylene-(1,5). The amino group is above all a di-lower alkylamino group such as the dimethylamino, diethylamino, dipropylamino, N-methyl-N-ethylamino group, an N-lower alkyl alkyl-N-cycloalkylamino groups such as the N-methyl-N-cyclopentyl or -cyclohexyl group, an N-dicycloalkylamino group, a possibly C-lower alkylated pyrrolidino, piperidino, morpholino, thiamorpholino, piperazino or N-lower alkyl- or hydroxy-lower alkyl-piperazino group such as the pyrrolidino, piperidino, morpholino, piperazino, N-methyl-, N-ethyl-, or N-β-hydroxyethyl-piperazino group. The amino group may, however, also be a mono-lower alkylamino group such as the methylamino, ethylamino propylamino group or a N-cycloalkylamino group.

In the aminoalkyl groups the amino group may be linked with the alkylene radical by a further lower aliphatic hydrocarbon radical, especially a lower alkylene radical, and it may carry a further substituent of the aforementioned kind.

Aminoalkyl groups of this kind are, for example, N-alkyl-pyrrolidinyl-(3)-alkyl groups or N-alkyl-piperidyl-(2)-, -(3)- or -(4)-alkyl groups.

The alkylene radical which links the terminal amino group with the oxygen atom attached to the nucleus is above all a lower linear or branched alkylene radical which preferably contains 2 to 4 carbon atoms, with the terminal amino group being separated from the oxygen atom attached to the nucleus by at least two carbon atoms, for example the propylene-(1,2), propylene-(1,3), butylene-(1,2), butylene-(1,3), butylene-(2,3), or butylene-(1,4) radical, or more especially one that contains 2 carbon atoms, such as an ethylene-(1,2) radical.

The invention relates in particular to compounds of the kind indicated that are further substituted in at least one of the positions 1 to 12, for example in positions 11 and 12 by lower alkyl radicals, such as those mentioned.

Furthermore, they may contain for instance in positions 1 to 8 of the anthracene ring lower alkyl, alkoxy or alkenyloxy or alkylmercapto groups, halogen atoms such as fluorine, chlorine, bromine or iodine or the pseudohalogen trifluoromethyl, or alkylsulfonyl, alkanoyl, nitro or amino groups, the alkyls being, for example, methyl, ethyl, propyl, isopropyl, butyl, isobutyl or tertiary butyl; as alkoxy or alkenyloxy groups there may be mentioned the methoxy, ethoxy, allyloxy or methylenedioxy group; as alkylmercapto groups the methylmercapto or ethylmercapto group, and as alkanoyl radicals above all the acetyl, propionyl or butyryl group. In position 10 the new compounds may contain above all an aliphatic hydrocarbon radical, such as one of the above-mentioned lower alkyl or alkenyl groups or a halogen atom.

Of special value are the compounds of the formula

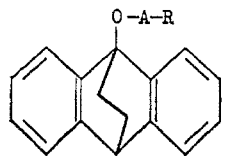

where A represents an alkylene group which contains 2 to 4 carbon atoms and separates the oxygen atom from the residue R by 2 or 3 carbon atoms, above all the ethylene-(1,2) or propylene-(1,3) group and R represents a pyrrolidino, piperidino, morpholino or piperazino group, for example an N-lower alkylpiperazino residue or an N-(2-hydroxyethyl)-piperazino residue, or above all a di-lower alkylamino or mono-lower alkylamino group.

Among these compounds, the following deserve special mention: 9-(2-methylaminoethoxy) - 9,10 - dihydro-9,10-ethano-anthracene, 9 - (2 - methylaminopropoxy)-9,10-dihydro - 9,10 - ethano-anthracene, 9 - (2-dimethylamino-1-methylethoxy)-9,10-dihydro-9,10-ethano-anthracene, 9-(2-diethylaminoethoxy) - 9,10 - dihydro-9,10-ethano-anthracene and more especially 9 - (2 - dimethylaminoethoxy)-9,10-dihydro-9,10-ethano-anthracene which, for example in the form of its hydrochloride, on peroral administration of doses of 0.1 to 1.0 mg./kg. bodyweight to guinea pigs produces a distinct protective effect against a lethal result of an intravenous histamine injection.

Special mention is deserved also by the compounds of the formula

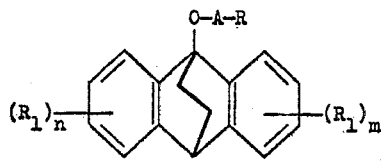

in which A and R have the meanings given above, and $R_1$ represents a trifluoromethyl, lower alkyl, lower alkoxy or nitro group or especially a halogen atom, and the symbols $n$ and $m$ each represent the integer 1 or 2, the radicals $R_1$ being identical or different.

Among this groups of compounds those are especially valuable which correspond to the formula

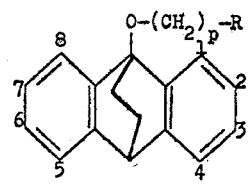

in which R has the meaning given above, and $p$ stands for the integer 2 or 3, and which in the 4- and 8-positions or in the 3-position or above all in the 2-position contain a chlorine atom, and primarily 2-chloro-9-(2-dimethyl-amino-ethoxy)-9,10-dihydro - 9,10 - ethano-(1,2)-anthracene, 2-chloro-9-(N-benzyl-N-methylamino-ethoxy)-9,10-dihydro-9,10-ethano-(1,2)-anthracene, as well as 2-chloro-9 - (methylamino-ethoxy)-9,10-dihydro-9,10-ethano-(1,2)-anthracene.

Also highly valuable are the compounds of the kind shown above in which the amino group is linked with the alkyl group by a substituent, primarily those of the formula

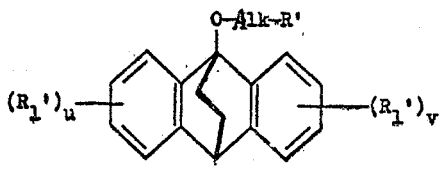

in which Alk represents a lower alkylene group, the symbols $R_1'$ each represents a halogen atom, a hydrogen atom, a lower alkyl, lower alkoxy, trifluoromethyl or nitro group, and $u$ and $v$ each stands for the integer 1 or 2, the radicals $R_1'$ being identical or different, and $R'$ represents a piperidyl or pyrrolidinyl radical which may be N-substituted.

Amnog this group of compounds, those are of particular interest which correspond to the formula

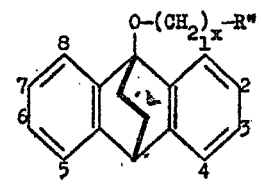

in which $x$ represents the integer 1 or 2, and $R''$ stands for an optionally N-methylated piperidyl-(2), -(3) or -(4) radical or a pyrrolidinyl-(2) or -(3) radical, and which may carry a chlorine atom in positions 4 and 8 or in position 3, or especially in position 2, and primarily the N-methyl-2-[9,10-dihydro - 9,10 - ethano-(1,2)-anthryl-(9)-hydroxymethyl]-piperidine of the formula

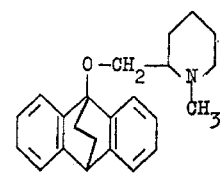

The new compounds are manufactured by known methods.

Preferably, in a 9,10-dihydro-9,10-ethano-(1,2)-anthracene that contains in position 9 a residue convertible into a corresponding aminoalkoxy group this radical is so converted.

A radical convertible into an aminoalkoxy group is, for example, the hydroxyl group. Thus, an aminoalkyl radical may be introduced into the hydroxyl group of a 9-hydroxy-9,10-dihydro-9,10-ethano-(1,2) - anthracene, said aminoalkyl radical containing the amino group in a position higher than 1. The aminoalkyl radical is advantageously introduced by means of a reactive ester of a suitable aminoalcohol. Reactive esters are in the first place those from hydrohalic acids, for example hydrochloric, hydrobromic or hydriodic acid, or from toluene-sulfonic acids. The reaction is advantageously performed in the presence of a basic condensing agent, especially one that is capable of forming salts with the hydroxyl group, for example an alkali metal alcoholate, hydride, amide or hydrocarbon compound, or with the use of a pre-formed salt of the hydroxy compound.

In a resulting compound substituents can be modified, introduced or eliminated to suit the final products as defined.

Thus, further substituents may be introduced in the usual manner into a resulting primary or secondary amino group.

For example, the amino group may be alkylated, for example by reaction with a reactive ester of an alkanol. Reactive esters to be used for this purpose are especially those mentioned above. The alkylation may also be achieved under reducing conditions, that is to say by reaction with a suitable carbonyl compound and subsequent or simultaneous reduction.

Similarly, other substituents present in the molecule may be converted in the usual manner, for example nitro groups on the aromatic radicals may be reduced to amino groups, or benzyl groups as substituents of the amoino group may be removed by hydrogenolysis in the usual manner.

The invention includes also any variant of the present process in which an intermediate obtained at any stage is used as starting material and any remaining step/steps is/ are carried out or the process is discontinued at any stage thereof, or in which a starting material is formed under the reaction conditions or is used in the form of a salt thereof.

The above-mentioned reactions are carried out in the usual manner in the presence or absence of diluents, condensing agents and/or catalysts, at room temperature or with cooling or heating, if desired or required under superatmospheric pressure.

The starting materials are known or can be prepared by known methods. Any new starting material used likewise forms an object of this invention.

Depending on the starting materials and reaction conditions used the final products are obtained in the free form or in the form of their salts which are likewise included in the invention. Thus, for example, basic, neutral, acid or mixed salts, if desired, also semi-, mono-, sesqui- or poly-hydrates thereof may be obtained. The salts of the final products may be converted into the free bases in known manner, for example with alkalies or ion exchange resins. When the free bases are reacted with organic or inorganic acids, especially acids suitable for forming therapeutically acceptable salts, salts are obtained. As such acids there may be mentioned, for example, hydrohalic, sulfuric, phosphoric acids, nitric and perchloric acid, aliphatic, alicyclic, aromatic or heterocyclic carboxylic or sulfonic acids, such as formic, acetic, propionic, succinic, glycollic, lactic, malic, tartaric, citric, ascorbic, maleic, hydroxy-maleic or pyruvic acid; phenylacetic, benzoic, para-amino-benzoic, anthranilic, para-hydroxybenzoic, salicylic or para-aminosalicylic acid, embonic, methanesulfonic, ethanesulfonic, hydroxyethanesulfonic, ethylenesulfonic acid; halobenzenesulfonic, toluenesulfonic, naphthalene-sulfonic acids or sulfanilic acid; methionine, tryptophan, lysine or arginine.

These or other salts of the new compounds, for example their picrates, may also be used for purifying the resulting bases by converting the latter into salts, isolating the salts and liberating the bases from them. In view of the close relationship between the new bases in the free form and in the form of their salts, what has been said above and below with reference to the free bases concerns also the corresponding salts wherever this is possible and expedient.

The new compounds may be used as medicaments in the form of pharmaceutical preparations containing them in conjunction or admixture with an organic or inorganic, solid or liquid pharmaceutical excipient suitable for enteral, for example oral, or parenteral administration. Suitable excipients are substances that do not react with the new compounds, for example water, gelatin, lactose, starches, magnesium stearate, talcum, vegetable oils, benzyl alcohols, gums, polyalkyleneglycols, white petroleum jelly, cholesterol or other known medicinal excipients. The pharmaceutical preparations may be, for example, tablets, dragees, capsules or suppositories, or in liquid form solutions, suspensions or emulsions. They may be sterilized and/or may contain assistants such as preserving, stabilizing, wetting or emulsifying agents, salts for regulating the osmotic pressure or buffers. They may also contain other therapeutically valuable substances. The new compounds may also be used in vertinary medicine, for example in one of the above-mentioned forms or in the form of animal fodder or additives to animal fodder in the breeding and feeding of animals, using, for example, the conventional extenders and diluents.

The following examples illustrate the invention.

EXAMPLE 1

A suspension of 1.7 g. of sodium hydride in 75 ml. of toluene is mixed with 15.0 g. of 9-hydroxy-9,10-dihydro-9,10-ethano-anthracene in 65 ml. of toluene and the whole is heated while being stirred for 6 hours at 90° C. Then 8.0 g. of dimethylaminoethyl chloride in 10 ml. of toluene are dropped in and the batch is heated for a further 4 hours at 90° C., then allowed to cool and the undissolved share is filtered off and the filtrate is agitated with 200 ml. of 2 N-hydrochloric acid. The solid precipitate formed is filtered off and mixed with 200 ml. of 2 N-sodium hydroxide solution. The precipitated base is extracted with ether, and the extract is dried and evaporated to leave an oil which is dissolved in alcohol. This solution is mixed with 5 ml. of a 10% solution of hydrochloric acid in alcohol. On addition of ether 9-(2-dimethyl-amino-ethoxy) - 9,10 - dihydro - 9,10-ethano-anthracene hydrochloride of the formula

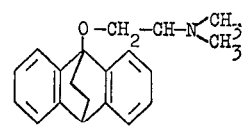

melting at 228 to 230° C. precipitates.

EXAMPLE 2

A mixture of 2.0 g. of sodium amide, 10.0 g. of 9-hydroxy-9,10-dihydrdo-9,10-ethano-anthracene and 100 ml. of benzene is heated for 6 hours at 90° C. Then 7.0 g. of diethylaminoethyl chloride are added and the mixture is stirred for another 6 hours at 90° C. The reaction mixture is filtered and the filtrate evaporated under a water-jet vacuum, to leave an oil to which 50 ml. of 2 N-hydrochloric acid are added. The precipitate formed is recrystallized from alcohol+ether, to yield 9-(2-diethylamino-ethoxy) - 9,10 - dihydro-9,10-ethano-anthracene hydrochloride of the formula

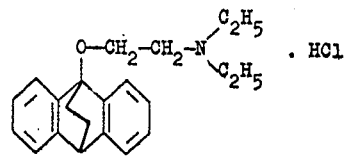

in crystals melting at 152 to 153° C.

EXAMPLE 3

A mixture of 10.0 g. of 9-hydroxy-9,10-dihydro-9,10-ethano-anthracene, 2.0 g. of sodium amide and 100 ml. of benzene is refluxed for 6 hours. 8.0 grams of 1-dimethylamino-2-chloropropane are then added, the batch is heated for another 6 hours at 90° C. and then cooled to room temperature. The undissolved share is filtered off and the filtrate evaporated to dryness under a water-jet vacuum, to leave an oil to which 10 N-alcoholic hydrochlocir acid is added. On addition of ether the 9-(2-dimethylamino - 1 - methylethyl)-9,10-dihydro-9,10-ethano (1,2)-anthracene hydrochloride of the formula

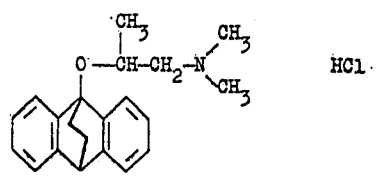

settles out in crystals melting at 179 to 180° C.

EXAMPLE 4

11.0 g. of 2-chloro-9-hydroxy-9,10-dihydro-9,10-ethano-(1,2)-anthracene are stirred for 5 hours with 1.2 g. of sodium hydride in 150 ml. of toluene while being heated at 90° C. After the addition of 9 g. of dimethylamino-ethyl chloride the batch is stirred on for another 2 hours at 90° C. It is then cooled to 10° C. before 5 ml. of ethanol and then 200 ml. of 2 N-hydrochloric acid are added. The hydrochloric acid layer is separated and rendered alkaline by the addition of 10 N-sodium hydroxide solution. The base which separates is extracted with methylene chloride. After drying of the solvent over sodium sulfate and evaporation, 2-chloro-9-(2-dimethylaminoethoxy)-9,10-dihydro-9,10-ethane-(1,2)-anthracene of the formula

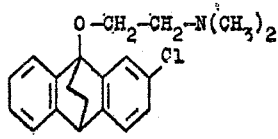

remains the hydrochloride of which melts at 177 to 180° C.

The 2-chloro-9-hydroxy-9,10-dihydro-9,10-ethano - (1,2)-anthracene used as starting material can be prepared as follows:

20 g. of 2-chloro-9-acetoxy-anthracene in 200 ml. of benzene are heated with methylene at 150° C. for 24 hours in an autoclave. The solution is then evaporated, and the residue treated with isopropanol. The crystalline residue is filtered and recrystallized from petroleum ether to obtain 2-chloro-9-acetoxy-9,10-dihydro-9,10-ethano-(1,2)-anthracene in the form of crystals which melt at 115–170° C.

16 g. of the acetoxy compound are boiled with 50 ml. of 2 N-sodium hydroxide solution and 150 ml. of methanol for 3 hours. The precipitate that forms is filtered off and the filtrate treated with water, 2-chloro-9-hydroxy-9,10-dihydro-9,10-ethano-(1,2)-anthracene settles out, and after being recrystallized from aqueous ethanol melts at 139–140° C.

EXAMPLE 5

22 g. of 9 - hydroxy - 9,10 - dihydro-9,10-ethano-(1,2)-anthracene are stirred for 6 hours with 2.5 g. of sodium hydride in 200 ml. of toluene while being heated at 90° C. The batch is then cooled to 60° C., treated with 18 g. of 1-methyl-2-chloromethyl-piperidine, and the whole stirred for 6 hours at 60° C. It is then cooled to room temperature. 10 ml. of methanol are added, and the reaction mass filtered. The filtrate is extracted with 2 N-hydrochloric acid. The acid extract is then rendered alkaline by the addition of sodium hydroxide solution, and extracted by agitation with methylene chloride. After drying and evaporation of the methylene chloride extract, N - methyl-2-[9,10-dihydro-9,10-ethano - (1,2) - anthryl-(9)-hydroxymethyl]-piperidine of the formula

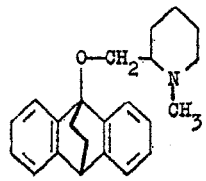

remains behind the hydrochloride of which melts at 243–244° C.

The 1-methyl-2-chloromethyl-piperidine used as intermediate product can be prepared as follows:

Hydrogen chloride is passed into a solution of 76 g. of 1-methyl-2-hydroxymethyl-piperidine in 400 ml. of chloroform while stirring until all of the amine is converted into the hydrochloride. With continued stirring, at 10° C., 200 ml. of thionyl chloride are added dropwise. The batch is heated at 50° C. for 1 hour and then evaporated under a water-jet vacuum. The hydrochloride of 1-methyl-2-chloromethyl-piperidine melting at 162–165° C. is obtained.

EXAMPLE 6

20 g. of 2-chloro-9-hydroxy-9,10-dihydro-9,10-ethano-(1,2)-anthracene was stirred for 5 hours while being heated at 90° C. with 1.9 g. of sodium hydride in 200 ml. of toluene. 15 g. of N-benzyl-N-methyl-amino-ethyl chloride are then added and stirring continued for 6 hours at 60° C. After cooling to room temperature, 5 ml. of ethanol are added dropwise, and the batch then treated with 200 ml. of 2 N-hydrochloric acid.

A precipitate forms which is recrystallized from isopropanol+ether.

There is obtained in this manner 2-chloro-9-(N-benzyl-N-methyl-aminoethoxy)-9,10-dihydro-9,10 - ethano-(1,2)-anthracene hydrochloride of the formula

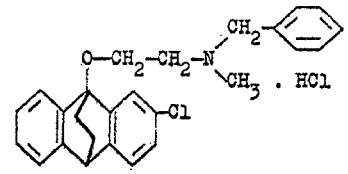

in the form of crystals which melts at 125–128° C.

EXAMPLE 7

18 g. of 2-chloro-9-(N-benzyl-N-methyl-aminoethoxy)-9,10 - dihydro-9,10-ethano - (1,2) - anthracene are hydrogenated in 200 ml. of ethanol in the presence of 3 g. of palladium carbon at room temperature. After the uptake of 980 ml. of hydrogen, the catalyst is filtered off, and the filtrate evaporated under a water-jet vacuum. The residue is dissolved in 50 ml. of ethanol, and 10 N-hydrochloric acid in ethanol is added until the solution has an acid reaction to methyl red.

The batch is then treated with ether until a precipitate forms. The latter is recrystallized from ethanol+ether. There is obtained in this manner 2-chloro-9-(methylamino-ethoxy)-9,10-dihydro-9,10-ethano - (1,2) - anthracene hydrochloride of the formula

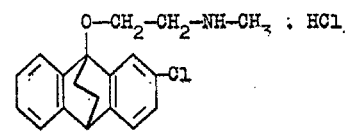

in the form of crystals which melt at 235–237° C.

EXAMPLE 8

22 g. of 9-hydroxy-9,10-dihydro-9,10-ethano-(1,2)-anthracene are heated at 90° C. while being stirred for 6 hours with 2.5 g. of sodium hydride in 200 ml. of toluene. 20 g. of N-benzyl-N-methyl-aminoethyl chloride are then added, and the batch heated at 60° C. for 6 hours, then cooled to room temperature. 5 ml. of methanol are added, and the batch then extracted with 200 ml. of 2 N-hydrochloric acid. The acid extract is rendered alkaline by the addition of 10 N-sodium hydroxide solution, then extracted with methylene chloride. After evaporation of the solvent, 9-(N-benzyl - N - methyl-aminoethoxy)-9,10-dihydro-9,10-ethano-(1,2)-anthracene of the formula

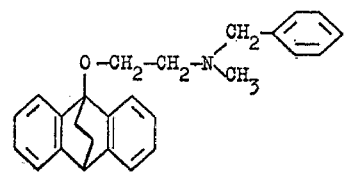

remains behind which melts at 112–115° C.

EXAMPLE 9

10 g. of 9-(N-benzyl-N-methyl-aminoethoxy)-9,10-dihydro-9,10-ethano-(1,2)-anthracene are dissolved in 150 ml. of methanol, and the solution treated with 2 g. of palladium carbon (10%) and hydrogenated at room temperature. Then the hydrogen uptake is complete, the catalyst is filtered off, and the filtrate evaporated. The residue is dissolved in 30 ml. of ethanol, and 5 ml. of 10 N-hydrochloric acid in ethanol added to the solution.

On the addition of ether, crystallization sets in. There is obtained in this manner 9-methylaminoethoxy-9,10-dihydro-9,10-ethano-(1,2)-anthracene hydrochloride of the formula

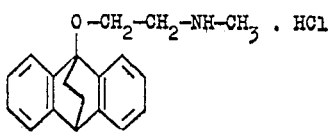

which melts at 255–257° C.

I claim:
1. A member selected from the group consisting of compounds of the formula

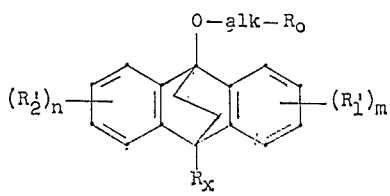

in which Alk stands for lower alkylene, $R_0$ for a member selected from the group consisting of c-pyrrolidinyl, piperidyl, N-lower alkyl-pyrrolidinyl and N-lower alkyl-piperidyl, $R_1'$ and $R_2'$ each stands for a member selected from the group consisting of lower alkyl, lower alkoxy, lower alkenyloxy, lower alkylmercapto, halogen, trifluoromethyl, lower alkylsulfonyl, lower alkanoyl, nitro and amino, $m$ and $n$ each stands for an integer from 0 to 2, and $R_x$ stands for a member selected from the group consisting of hydrogen, lower alkyl, lower alkenyl and halogen, and their acid addition salts.

2. A product as claimed in claim 1, in which $R_1'$ and $R_2'$ each stands for a member selected from the group consisting of halogen, lower alkyl, lower alkoxy, trifluoromethyl and nitro, $n$ and $m$ each stands for an integer 0 to 2, and $R_x$ stands for hydrogen.

3. A product as claimed in claim 1, in which alk stands for a member selected from the group consisting of methylene and ethylene, $R_0$ for a member selected from the group consisting of N-methyl-piperidyl-(2), N-methyl-piperidyl-(3), N-methyl-piperidyl-(4), N-methyl-pyrrolidinyl-(2) and N-methyl-pyrrolidinyl-(3), $(R_1')_m$ and $(R_2')_n$ represent a chlorine atom when in one of the following positions:
(a) 4- and 8-position
(b) 3-position
(c) 2-position
or otherwise a hydrogen atom, and $R_x$ stands for hydrogen.

4. A product as claimed in claim 1, said product being the N-methyl-2-[9,10 - dihydro-9,10-ethano-(1,2)-anthryl-(9)-oxymethyl]-piperidine of the formula

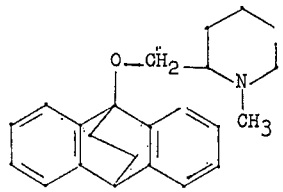

or an acid addition salt thereof.

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |

HENRY R. JILES, Primary Examiner

S. D. WINTERS, Assistant Examiner

U.S. Cl. X.R.

260—239, 243, 247.1, 247.7, 268, 293.4, 326.5, 570.7, 999